Patented June 5, 1934

1,961,398

UNITED STATES PATENT OFFICE

1,961,398

METHOD OF SEPARATING COMPONENTS OF PINE OIL

Lee T. Smith, Kenvil, N. J., assignor to Hercules Powder Company, Wilmington, Del., a corporation of Delaware No Drawing. Application August 11, 1928, Serial No. 299,118

10 Claims. (Cl. 260—153)

My invention relates to an improved method of separating the components of pine oil and particularly those which when relatively pure crystallize at ordinary temperature, namely alpha terpineol, fenchyl alcohol, borneol and anethol.

Pine oil, as is known, comprises various components namely, hydrocarbons, tertiary and secondary alcohols, ethers, ketones and aldehydes. In, for example, a high grade of steam distilled pine oil the tertiary alcohol, most of which is alpha-terpineol, amounts to from about 55% to 70%. The secondary alcohols, namely borneol and fenchyl alcohol and the ether, anethol are minor constituents, the exact percentage, depending largely upon the amount of hydrocarbons present which normally amounts to about 5-20%.

The primarily most valuable components of pine oil are now the tertiary alcohol, alpha terpineol, the secondary alcohols, borneol and fenchyl alcohol and the ether, anethol. These components may be readily separated from the hydrocarbons by distillation since the hydrocarbons boil below 190° C. as compared to boiling points of above 195° C. for the secondary and tertiary alcohols and other components, which are only slightly soluble in the hydrocarbons. The secondary alcohols and the anethol are separated from the tertiary alcohols with substantial difficulty and relatively incompletely, in view of the fact that they are soluble in and have similar boiling points (200-237° C.) to those of the tertiary alcohols, including alpha-terpineol, which boil at about 218° C.

The separation of the secondary alcohols, as borneol and fenchyl alcohol and of anethol from pine oil and from each other has been heretofore effected by, for example, the method disclosed in and forming the subject matter of the application for patent of Irvin W. Humphrey, Serial No. 185,070, filed April 19, 1927, and which involves the treatment of pine oil to effect the dehydration of the tertiary alcohols for the formation of water and hydrocarbons which may be readily separated from the secondary alcohols, along with the hydrocarbons normally components of the pine oil by distillation, after which the secondary alcohols and the anethol may be separated from one another and from the remaining components of the pine oil by distillation. Such process is highly advantageous but is open to objection when recovery of the alpha-terpineol is desirable, since, in the dehydration step, the alpha-terpineol is destroyed as such, being converted primarily into water and the hydrocarbon dipentene.

Now in accordance with my invention, I so treat pine oil as to effect the separation therefrom of the major portion of the alpha-terpineol as such, in crystalline form, then treat to effect conversion of any remaining alpha-terpineol and other tertiary alcohols into water and hydrocarbons which are separated, by distillation, from the secondary alcohols and the anethol, which are finally separated from each other by distillation. Preferably, my invention involves initial fractionation of pine oil into cuts in order to effect concentration of the tertiary alcohols and subjecting a cut or cuts rich in tertiary alcohols to the treatment.

In the practical application of the method in accordance with my invention, I preferably subject pine oil to fractional distillation and collect a cut or cuts which contain relatively small amounts of alpha-terpineol but which contain considerable amounts of other tertiary alcohols, boiling below alpha-terpineol, for example, a cut boiling within about the range 190° C.-205° C.; or cuts boiling within about the ranges 205° C.-208° C. and 208° C.-214° C.; and a cut or cuts rich in alpha-terpineol, but containing only small proportions of other substances, for example, a cut boiling within about the range 214° C.-218° C., or cuts boiling within about the range 218° C.-230° C.

The cuts having been obtained, the cut, or cuts, rich in alpha-terpineol are refrigerated, for example, to −10° C., or refrigerated and seeded, for example, with a crystal of alpha-terpineol, a grain of sand, or the like, to effect crystallization of the major portion of the alpha-terpineol, which is then separated by any convenient method, as by decanting off the mother liquor or centrifuging.

The mother liquor, after the separation of the crystallized alpha-terpineol, is then subjected to dehydration to effect the breaking down of residual alpha-terpineol and any other tertiary alcohols present into water and hydrocarbons. The dehydration is effected through heating with a dehydrating agent as fuller's earth, or other argillaceous earth, iodine, bromine, siliceous earth, such as kieselguhr, activated carbon, etc., which will selectively attack the tertiary alcohols and not affect the secondary alcohols or the anethol. The cut, or cuts, containing only a small amount of alpha-terpineol and considerable amounts of other tertiary alcohols are subjected to dehydration as in the case of the mother liquor remaining after removal of the crystallized alpha-terpineol, and such cut, or cuts, may be subjected to dehydration separately or they may be mixed with the mother liquor, before dehydration, and the mixture subjected to dehydration.

After dehydration of the mother liquor remaining after the removal of the crystallized alpha-terpineol and of the cut, or cuts, containing only small amounts of alpha-terpineol, whether they be dehydrated separately or in admixture, the hydrocarbons resulting from the breaking down of the residual alpha-terpineol and other tertiary alcohols, and which boil at about 190° C. (about 170° C.–190° C.), are distilled off and finally the secondary alcohols, as borneol (boiling point about 212° C.) and fenchyl alcohol (boiling point about 201° C.) and the anethol (boiling point about 234° C.), are separately recovered by fractional distillation of the residue and refrigeration, or refrigerating and seeding, of the cuts obtained.

As a more specific example of the practical application of my invention, for example, pine oil is fractionated and fractions, or cuts, separately collected. The fractions, or cuts, may have the boiling ranges as shown in the following table:

No. 1. Boiling below 190° C.
No. 2. 190° C.–205° C.
No. 3. 205° C.–208° C.
No. 4. 208° C.–214° C.
No. 5, 214° C.–218° C.
No. 6. Boiling over 218° C.

The cut No. 1 boiling below 190° C., comprising principally hydrocarbons, is set aside. The cut No. 5, in which alpha-terpineol is concentrated, is refrigerated, for example to −10° C. and seeded to effect the crystallization of the major portion of the alpha terpineol contained therein, the crystallized alpha-terpineol being separated by centrifugation.

The cuts Nos. 2, 3, 4 and 6 and the mother liquor, resulting from the crystallization of alpha-terpineol from cut No. 5, are then subjected to dehydration, separately, for example, by adding to them about 1–5% of fuller's earth and heating to a temperature of about 150° C., for a period of 2–8 hours, or by adding .05–5% of iodine and heating to a temperature of about 180° C., for about 1–6 hours. As a result of the dehydration treatment any residual alpha-terpineol in the mother liquor and tertiary alcohols in cuts Nos. 2, 3, 4 and 6 will be broken down into water and hydrocarbons which boil below 190° C. and which are readily fractionated from the respective dehydrated cuts, leaving residues containing fenchyl alcohol, borneol, or anethol which may be readily separated from the residues by fractional distillation thereof followed by refrigeration or refrigeration and seeding, or where the cuts are sufficiently rich, by refrigeration and seeding without prior distillation.

If desired, the cuts Nos. 2, 3, 4 and 6 may be mixed with each other and with the mother liquor before dehydration, but with such procedure the secondary alcohols and the anethol will be all in one residue rather than in separate residues and hence separate recovery will involve somewhat greater care in fractionating.

As a further example of the practical adaptation of the method according to my invention, pine oil is fractionated into cuts No. 1 boiling below 214° C. and No. 2 boiling between 214° C.–218° C., a residue being left. From cut No. 2, after refrigeration to say about −10° C. and seeding, a large amount of alpha-terpineol will separate out in crystalline form. The mother liquor resulting from the crystallization of alpha-terpineol is added to cut No. 1, the residue is added and the mixture subjected to dehydration, for example, through heating to say a temperature of about 150° C. with about 1–5% of fuller's earth for about 2–8 hours, or to a temperature of say about 180° C. with about 0.05–5% of iodine for about 1–6 hours. The dehydrated mixture is distilled to separate off the hydrocarbons and water boiling below 190° C. The residue is fractionally distilled and pure fenchyl alcohol, b. p. 201° C., borneol, b. p. 212° C., and anethol, b. p. 234° C. separated by crystallization from the several distillates, or cuts obtained, as by refrigeration, or refrigeration and seeding.

The amount of recovery, or separation, of the desirable constituents of the pine oil according to the method of my invention will depend somewhat upon the efficiency of the initial fractionation and the amount and character of the dehydrating agent, it being desirable to avoid the formation of any considerable amount of high-boiling polymerized hydrocarbons which will effect destruction of a part of the desired products and which will tend to retain borneol, fenchyl alcohol and anethol in solution preventing their crystallization.

It will be understood that where in the claims appended hereto reference is made to pine oil, I intend to include by the term pine oil, a cut, or cuts, obtained by the fractional distillation of pine oil.

Having now fully described my invention, what I claim and desire to protect by Letters Patent is:

1. The method of separating fenchyl alcohol, borneol and anethol from pine oil which includes fractionating pine oil to obtain a cut boiling within about the range 214° C.–218° C. and rich in alpha-terpineol and cuts boiling within about the range 195° C.–240° C. and containing tertiary alcohols, refrigerating the cut rich in alpha-terpineol to effect crystallization of alpha-terpineol therefrom, separating the crystallized alpha-terpineol from said cut, treating the several cuts with a dehydrating agent to effect the conversion of tertiary alcohols contained therein into hydrocarbons and water, fractionating the cuts at a temperature within about the range 170° C.–190° C. for the separation therefrom of hydrocarbons, fractionating the residues to obtain cuts boiling within about the range 195° C.–205° C. and rich in fenchyl alcohol, 208° C.–214° C. and rich in borneol, and 225° C.–244° C. and rich in anethol and effecting the crystallization of fenchyl alcohol, borneol and anethol from the cuts respectively.

2. The method of separating a secondary alcohol from pine oil which includes separating a tertiary alcohol in crystalline form from the pine oil, converting residual tertiary alcohols in the residue to hydrocarbons and water, fractionating off the hydrocarbons and separating a secondary alcohol from the residue.

3. The method of separating secondary alcohols from pine oil which includes separating a tertiary alcohol in crystalline form therefrom, subjecting the residue to dehydration to effect conversion of residual tertiary alcohols in the residue to hydrocarbons and water, fractionating the residue into cuts rich in the secondary alcohols respectively and effecting crystallization of the secondary alcohols from the cuts respectively.

4. The method of separating pine oil into its individual constituents which includes separating alpha-terpineol in crystalline form from the pine oil, subjecting the residue to dehydration to effect the conversion of tertiary alcohols contained therein into hydrocarbons and water, fractionating off hydrocarbons, fractionating the residue to obtain cuts rich in the individual constituents of the residue and separating the several constituents from the several cuts respectively.

5. The method of separating pine oil into its individual constituents which includes separating alpha-terpineol in crystalline form from the pine oil, subjecting the residue to dehydration to effect the conversion of tertiary alcohols contained therein into hydrocarbons and water, fractionating off hydrocarbons, fractionating the residue to obtain cuts rich in the individual constituents of the residue and crystallizing the several constituents from the several cuts respectively.

6. The method of separating secondary alcohols from pine oil which includes fractionating pine oil to obtain a plurality of cuts, one of which contains the major part of the alpha-terpineol content of the pine oil, crystallizing alpha-terpineol from the cut containing the major part of the alpha-terpineol content of the pine oil, separating crystalline alpha-terpineol, mixing the cuts, dehydrating the mixed cuts to convert tertiary alcohols contained therein to hydrocarbons and water, fractionating off hydrocarbons, fractionating the residue into fractions rich in secondary alcohols and crystallizing a secondary alcohol from the several cuts respectively.

7. The method of separating fenchyl alcohol, borneol and anethol from pine oil which includes fractionating pine oil to obtain a plurality of cuts, one of which contains the major part of the alpha-terpineol content of the pine oil, crystallizing alpha-terpineol from the cut containing the major part of the alpha-terpineol content of the pine oil, separating crystalline alpha-terpineol, mixing the cuts, dehydrating the mixed cuts to convert tertiary alcohols contained therein to hydrocarbons and water, fractionating off hydrocarbons, fractionating the residue into fractions rich in fenchyl alcohol, borneol and anethol and crystallizing fenchyl alcohol, borneol and anethol from the several cuts respectively.

8. The method of separating borneol from pine oil which includes separating a tertiary alcohol in crystalline form from pine oil, converting residual tertiary alcohols in the remaining pine oil into hydrocarbons and water, fractionating off the hydrocarbons, fractionating the residue to obtain a cut rich in borneol and separating the borneol from said cut.

9. The method of separating borneol from pine oil which includes fractionating the pine oil to obtain a cut rich in alpha-terpineol, crystallizing alpha-terpineol from said cut, dehydrating the mother liquor for the conversion of residual tertiary alcohols to hydrocarbons and water, fractionating off hydrocarbons, fractionating the residue to obtain a cut rich in borneol and effecting crystallization of borneol from said cut.

10. The method of separating borneol from pine oil which includes separating alpha-terpineol in crystalline form from the pine oil, converting tertiary alcohols remaining in the pine oil to hydrocarbons and water, fractionating off hydrocarbons and water, fractionating the residue to obtain a cut rich in borneol and crystallizing borneol from said cut.

LEE T. SMITH.